(12) United States Patent
Lee et al.

(10) Patent No.: US 12,469,487 B2
(45) Date of Patent: Nov. 11, 2025

(54) METHOD AND APPARATUS FOR MULTILINGUAL SPEECH RECOGNITION BASED ON ARTIFICIAL INTELLIGENCE MODELS

(71) Applicant: POSTECH Research and Business Development Foundation, Pohang-si (KR)

(72) Inventors: Geun Bae Lee, Pohang-si (KR); Won Jun Lee, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 451 days.

(21) Appl. No.: 17/954,185

(22) Filed: Sep. 27, 2022

(65) Prior Publication Data

US 2023/0162727 A1 May 25, 2023

(30) Foreign Application Priority Data

Nov. 22, 2021 (KR) .................... 10-2021-0161358
Jun. 22, 2022 (KR) .................... 10-2022-0076334

(51) Int. Cl.
| | |
|---|---|
| *G10L 15/16* | (2006.01) |
| *G06N 3/08* | (2023.01) |
| *G10L 15/00* | (2013.01) |
| *G10L 15/02* | (2006.01) |
| *G10L 15/22* | (2006.01) |

(52) U.S. Cl.
CPC ............ *G10L 15/16* (2013.01); *G10L 15/005* (2013.01); *G10L 15/02* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 12,032,920 B2 * | 7/2024 | Jia | ............................ G06F 40/58 |
| 2017/0148431 A1 | 5/2017 | Catanzaro et al. | |
| 2021/0005182 A1 | 1/2021 | Han et al. | |
| 2023/0162727 A1 * | 5/2023 | Lee | .......................... G10L 15/32 |
| | | | 704/232 |
| 2024/0265924 A1 * | 8/2024 | Li | .......................... G10L 15/063 |

FOREIGN PATENT DOCUMENTS

| | | | | |
|---|---|---|---|---|
| CN | 113782014 B | * | 3/2024 | ........... G10L 15/063 |
| JP | 2021043272 A | | 3/2021 | |
| KR | 10-2017-0107015 A | | 9/2017 | |
| KR | 10-2292479 B1 | | 8/2021 | |

* cited by examiner

*Primary Examiner* — Shreyans A Patel
(74) *Attorney, Agent, or Firm* — Morgan, Lewis & Bockius LLP

(57) ABSTRACT

A method for automatic multilingual speech recognition may comprise: recognizing input audio data by a speech recognizer; classifying the audio data by a speech language classifier; activating, by an output layer selector coupled to the speech recognizer, any one projection output layer of a plurality projection output layers respectively connected to the speech recognizer according to language classification information received from the speech language classifier, an output unit of the activated projection output layer being configured as several bytes; and recombining outputs output in a unit of the several bytes by the activated projection output layer, and outputting the recombined output as an automatic speech recognition result for the audio data.

20 Claims, 5 Drawing Sheets

METHOD AND APPARATUS FOR MULTILINGUAL SPEECH RECOGNITION BASED ON ARTIFICIAL INTELLIGENCE MODELS

CROSS-REFERENCE TO RELATED APPLICATIONS

This application claims priority to Korean Patent Application Nos. 10-2021-0161358, filed on Nov. 22, 2021, and 10-2022-0076334, filed on Jun. 22, 2022, with the Korean Intellectual Property Office (KIPO), the entire contents of which are hereby incorporated by reference.

BACKGROUND

1. Technical Field

The present disclosure relates to speech recognition technology, and more particularly, to a method and apparatus for automatically recognizing audio data in multiple languages based on an artificial intelligence model.

2. Related Art

As fields that require multilingual speech recognition technology, there are public institutions, sightseeing places, information desks, artificial intelligence assistants, and kiosks, which are used by both foreigners and locals. For example, when a speech recognition technology is to be used in sightseeing places or airports where tourists of different nationalities gather, multilingual speech recognition technology is required in general.

In addition, when speech recognition is applied to foreign language learning software, a speech recognitor can recognize a learner's utterance through direct pronunciation in the process of learning a foreign language, so that only the word being studied can be used to determine whether it is correctly pronounced.

In the field of artificial intelligence, deep learning-based speech recognition models are typically designed and trained to recognize one language, and the speech recognition system that supports the majority of multiple languages performs speech recognition using a separate model for each language. This technology can be used in a multilingual speech recognitor, an artificial intelligence assistant, an artificial intelligence speaker, a self-service ordering kiosk, and the like.

A conventional speech recognition system does not support multiple languages, or even use multiple models for each language, even if it supports multiple languages. In addition, when a speech recognition model for each language is used separately, as the number of supported languages increases, an issue may arise in relation to memory usage.

SUMMARY

The present disclosure has been derived to solve the above described conventional problems, and an object of the present disclosure is to provide a method and apparatus for multilingual speech recognition based on an artificial intelligent model, which can automatically recognize audio data in multiple languages including Korean based on a single artificial intelligence model.

Another object of the present disclosure is to provide a method and apparatus for multilingual speech recognition, which use an output layer for each language so as to automatically recognize multilingual audio data with a single model.

Another object of the present disclosure is to provide a method and apparatus for multilingual speech recognition, which can automatically recognize audio data in multiple languages with a single model by activating only a specific output layer corresponding to a speech language recognized earlier, among the output layers for respective languages using a speech language classifier and/or an output layer selector.

Still another object of the present disclosure is to provide a method and apparatus for multilingual speech recognition, which can perform multilingual speech recognition with only one model of memory even in a kiosk of low-specification, a personal computer (PC), a computer terminal, and the like.

According to an exemplary embodiment of the present disclosure, a method for automatic multilingual speech recognition that automatically recognizes audio data in multiple languages based on artificial intelligence of a single model may comprise: recognizing input audio data by a speech recognizer; classifying the audio data by a speech language classifier; activating, by an output layer selector coupled to the speech recognizer, any one projection output layer of a plurality projection output layers respectively connected to the speech recognizer according to language classification information received from the speech language classifier, an output unit of the activated projection output layer being configured as several bytes; and recombining outputs output in a unit of the several bytes by the activated projection output layer, and outputting the recombined output as an automatic speech recognition result for the audio data.

The plurality of projection output layers may include a first projection output layer dedicated to a first language, a second projection output layer dedicated to a second language, and a third projection output layer dedicated to a general-purpose language.

In the step of activating any one projection output layer, it may be determined whether confidence of speech language classification included in the language classification information is less than a first reference value, and when the confidence is less than the first reference value, the third projection output layer may be activated.

A unicode of the several bytes may support each language to be expressed in an octal representation with a combination of 256 (28) one byte (8 bits), wherein when a number of languages supported by an apparatus for automatic multilingual speech recognition increases, a size of a single model of the apparatus for automatic multilingual speech recognition is configured to increase only the projection output layer supporting a 256-step output.

The first language may include Korean, and the first projection output layer may be configured to express a combination of a preset number of unicode, which is a character combination of Hangul for the Korean, in 256 bytes.

The step of classifying the audio data may include the steps of: extracting speech information by dividing the audio data into a unit of a predetermined size by a speech information extractor; obtaining, by a projector layer connected to the speech information extractor, a mean pooling of the speech information extracted in the unit of the predetermined size; and classifying, by a classifier connected to the projector layer, which of preset languages corresponds to the mean pooling of the speech information extracted in the unit of the predetermined size.

The step of extracting the speech information may include the step of extracting a feature of the audio data by a feature extractor having a convolutional neural network (CNN) structure which is composed of a plurality of layers receiving the audio data as an audio input.

The step of extracting the speech information may further include the step of extracting speech feature information or the language classification information corresponding to the speech feature information from the extracted feature by a transformer encoder composed of a plurality of layers connected to the feature extractor.

In the step of obtaining the mean pooling, the mean pooling may be performed on the speech information extracted in the unit of the predetermined size by the projector layer.

The unit of the predetermined size may be a unit of 25 milliseconds (ms).

According to another exemplary embodiment of the present disclosure, an apparatus for automatic multilingual speech recognition that automatically recognizes audio data in multiple languages based on artificial intelligence of a single model may comprise: a processor; and a memory that stores at least one instruction executed by the processor, wherein when the processor is executed, the at least one instruction causes the processor to perform the steps of: recognizing input audio data by a speech recognizer; classifying the audio data by a speech language classifier; activating, by an output layer selector coupled to the speech recognizer, any one projection output layer of a plurality projection output layers respectively connected to the speech recognizer according to language classification information received from the speech language classifier, an output unit of the activated projection output layer being configured as several bytes; and recombining outputs output in a unit of the several bytes by the activated projection output layer, and outputting the recombined output as an automatic speech recognition result for the audio data.

The plurality of projection output layers may include a first projection output layer dedicated to a first language, a second projection output layer dedicated to a second language, and a third projection output layer dedicated to a general-purpose language.

In the step of activating any one projection output layer, the at least one instruction may cause the processor to activate the third projection output layer when confidence of speech language classification included in the language classification information is less than a first reference value.

A unicode of the several bytes may support each language to be expressed in an octal representation with a combination of 256 (28) one byte (8 bits), wherein when a number of languages supported by the apparatus for automatic multilingual speech recognition increases, a size of a speech recognition model of the apparatus for automatic multilingual speech recognition may be configured to increase only the projection output layer supporting a 256-step output.

The first language may include Korean, and the first projection output layer may be configured to express a combination of a preset number of unicode, which is a character combination of Hangul for the Korean, in 256 bytes.

In the step of classifying the audio data, the at least one instruction may cause the processor to perform the steps of: extracting speech information by dividing the audio data into a unit of a predetermined size by a speech information extractor; obtaining, by a projector layer connected to the speech information extractor, a mean pooling of the speech information extracted in the unit of the predetermined size; and classifying, by a classifier connected to the projector layer, which of preset languages corresponds to the mean pooling of the speech information extracted in the unit of the predetermined size.

In the step of extracting the speech information, the at least one instruction may cause the processor to perform the step of extracting a feature of the audio data by a feature extractor having a convolutional neural network (CNN) structure which is composed of a plurality of layers receiving the audio data as an audio input.

In the step of extracting the speech information, the at least one instruction may cause the processor to further perform the step of extracting speech feature information or the language classification information corresponding to the speech feature information from the extracted feature by a transformer encoder composed of a plurality of layers connected to the feature extractor.

In the step of obtaining the mean pooling, the at least one instruction may cause the processor to perform the mean pooling on the speech information extracted in the unit of the predetermined size by the projector layer.

The unit of the predetermined size may be a unit of 25 milliseconds (ms).

According to the present disclosure, there is an advantage that automatic multilingual speech recognition is possible with a single model, unlike the conventional speech recognition model that supports only a single language, that is, the conventional art that requires a plurality of models for a plurality of languages. In particular, by configuring the speech recognition model to add and use a separate output layer for each language, it is possible to solve the problem that a speech recognition system with a single model has a lower recognition rate than that of a speech recognition system with multiple models, thereby implementing an efficient automatic multilingual speech recognition system.

Also, according to the present disclosure, when supporting multiple languages, a process in which the user has to select a language to be recognized before starting speech recognition can be omitted. In addition, by adding a language classification process, it is possible to automatically identify which language it is without the user having to explicitly select the language.

In addition, according to the present disclosure, performance can be improved by activating an output layer dedicated to a specific language in the speech recognition model using language classification information to recognize a corresponding language. In addition, when the confidence of speech language classification is low, a malfunction of automatic speech recognition can be prevented by utilizing and using a general-purpose output layer.

In addition, according to the present disclosure, since multiple languages can be simultaneously recognized in one model, unlike the existing monolingual speech recognitor, multilingual speech recognition can be performed in various devices with only one model of memory. In particular, there is an effect that multilingual speech recognition is possible with only one deep learning model in kiosks of low specification, personal computers (PCs), and computer terminals. In addition, it is possible to improve the speech recognition performance of each language of low resources by sharing the acoustic model.

DETAILED DESCRIPTION OF THE EMBODIMENTS

Figure 1:
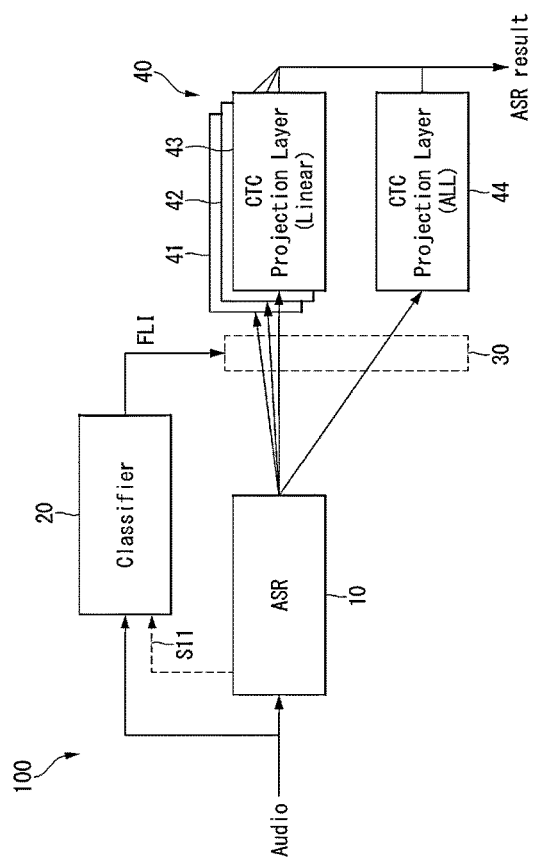
FIG. 1 is a schematic block diagram of an overall structure of an apparatus for automatic multilingual speech recognition according to an embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a schematic block diagram of an overall structure of an apparatus for automatic multilingual speech recognition according to an embodiment of the present disclosure.

Referring to FIG. 1, an apparatus for multilingual automatic speech recognition (hereinafter 'speech recognition apparatus') 100 may include a single artificial intelligence model, and more specifically, the single artificial intelligence model may be configured to include a speech recognitor 10 and an output layer 40 for each language.

The speech recognitor 10 may be briefly referred to as an ASR 10, and may be configured to extract a feature from audio data by a feature extractor of a Convolutional Neural Network (CNN) structure composed of a plurality of layers, and then to extract speech feature information from the extracted feature by a transformer encoder composed of multiple layers. The CNN structure may include a 7-layer structure and the like, and the transformer encoder may include a 24-layer structure and the like. This speech recognitor 10 may be referred to as a Wav2Byte speech recognition model.

The output layer 40 for each language may include a first projection layer 41 dedicated to a first language, a second projection layer 42 dedicated to a second language, and a general-purpose projection layer 44. Each projection layer may be referred to as a projection output layer, respectively.

In addition, the output layer 40 for each language may further include a third projection layer 43 for any one specific language selected from Chinese, Spanish, English, Hindi, Arabic, Bengali, Portuguese, Russian, Japanese, Randa, Marathi, Telugu, Malay, Turkish, Korean, French, German, Vietnamese, Tamil, Urdu, Javanese, Italian, Persian, Gujarati, Bhojpuri, and the like.

In this embodiment, the first to third languages are different languages. For example, the first language may be Korean, the second language may be English, and the third language may be Japanese.

The above-described speech recognition apparatus 100 may be configured to perform automatic speech recognition of audio data in multiple languages based on a single model of artificial intelligence. To this end, the speech recognition apparatus 100 recognizes input audio data, and recombines outputs generated from audio data by a specific projection output layer activated according to the recognition and having an output unit of a predetermined number of bytes to output an automatic speech recognition result (ARS result). The output unit may be 1 byte, and in this case, the apparatus may be miniaturized by reducing its size compared to an apparatus having an output unit of 2 bytes, and may have an improved processing speed due to a relatively small output unit.

That is, the speech recognition apparatus 100 may be configured to generate the automatic speech recognition result by configuring the output unit of the projection output layer as 1 byte and recombining 256 outputs each having an output unit of 1 byte for each language.

According to the above-described configuration of the speech recognizer 10 and the output layer 40 for each language, it is possible to automatically perform speech recognition for audio data in multiple languages using a single model, for example, a single artificial intelligence model.

Meanwhile, the above-described speech recognition apparatus 100 may be configured to separately include a component for classifying speech languages to activate a specific projection output layer according to input audio data. That is, the speech recognition apparatus 100 may further include a speech language classifier 20. The speech language classifier 20 may be simply referred to as a classifier 20.

The classifier 20 may be formed based on any one of a Wav2Vec model and a VQ-Wav2Vec model, which are neural network-based feature extraction techniques, which will be described later.

The Wav2Vec model may be composed of an encoder network and a context network. Both networks can be configured as a convolutional neural network (CNN). Here, the encoder network encodes a speech input with a hidden representation, and the context network converts the hidden representation into a context representation. When the Wav2Vec model has been trained, the context representation can be used as a feature of corresponding audio data.

That is, the Wav2Vec model may be trained in the process of binary classification on whether input audio data is a positive pair or a negative pair. The positive pair may be configured of the i-th context representation of the input audio data and the i+1-th hidden representation, and the negative pair may be configured of a randomly extracted one of the i-th context representation of the input audio data and the hidden representations of other audio data in a current position.

As the training of the Wav2Vec model progresses, the representation with a relationship with the positive pair approaches a vector space, and the representation with a relationship with the negative pair moves away from the vector space. In other words, the encoder network and the context network can incorporate information about what the next sequence of the input audio data will be in the feature of the audio data.

The VQ-Wav2Vec model may have the same architecture as the aforementioned Wav2Vec model except that a vector quantization (VQ) module is added in the middle. The vector quantization module may be configured by applying a Gumbell softmax method or a K-means clustering method.

In the Gumbell softmax method of the VQ-Wav2Vec model, a logit is made by linearly transforming the hidden representation, and then the Gumbell softmax and argmax are sequentially applied to the logic to make a one-hot vector. The continuous hidden representation is dot product with a one-hot vector and an embedding matrix, so that the hidden presentation is transformed into a discrete variable selected from among multiple embeddings.

In this way, the classifier 20 may be configured by combining the CNN and the transformers.

In addition, the above-described classifier 20 may be configured to be triggered by a synchronization signal or control signal S11 transmitted at the time of speech input of the speech recognitor 10 to classify which language the input audio data belongs to, and to output feed language information (FLI) including language classification information for the speech.

Meanwhile, in the above configuration, the automatic multilingual speech recognition apparatus 100 may further include an output layer selector 30 for activating a specific output layer among a plurality of output layers based on the feed language information (FLI).

The output layer selector 30 may be configured to activate one output layer according to a signal level of the feed language information or a stored value corresponding thereto. The output layer selector 30 may be installed at an output terminal of the speech recognitor 10 or an input terminal of each output layer 40 for each language, or between them, in order to activate one output layer among the output layers 40 for respective languages.

That is, the output layer selector 30 may be configured to activate or connect one specific output terminal of the speech recognitor 10, and similarly activate or connect an input terminal of one specific output layer among the output layers 40 for respective languages. Alternatively, the output layer selector 30 may be configured to activate any one of a plurality of wires or logical channels installed to connect between the output terminal of the speech recognitor 10 and each input terminal of each output layer 40 for each language.

According to the above configuration, an artificial intelligence model inputs the audio data received as an input to the speech recognitor 10 and the classifier 20, respectively, and may generate a final speech recognition result (ARS result) by selecting a specific output layer from among connectionist temporal classification (CTC) projection output layers for respective languages of the speech recognitor 10 using the feed language information (FLI), which is the output of the classifier 20.

In addition, in the above configuration, when the confidence of speech language classification is less than a preset reference value, for example, 70%, an ARS result may be generated by using a general-purpose (ALL) language output layer, rather than a dedicated language output layer, in order to prevent a malfunction of the speech recognition apparatus 100. The reference value may be arbitrarily configured according to the type or use of the automatic speech recognition apparatus.

As described above, in this embodiment, the speech language is classified using the classifier 20 for classifying the speech language of the input audio data, and the language to be output by the speech recognitor (ASR) 10 can be selected using the classified language. In addition, when the confidence of speech classification is low, the speech recognition result may be output using the general-purpose output layer 44 that outputs all languages supported by the speech recognitor 10.

That is, the structure of the speech recognizer is configured so that all recognized languages recognized by an artificial intelligence model structure proposed for multilingual speech recognition share the Wav2Byte model in common, and is configured to have a separate CTC projection output layer. In addition, it is possible to output the optimal speech recognition result by activating the CTC projection output layer of a corresponding language in the speech recognition step by determining what language the user uttered through the speech language classifier. In particular, the output unit of the CTC projection output layer is configured to a unicode corresponding to a predetermined byte, for example, 1 byte (8 bits) for each language, and by generating and recombining a plurality of audio data outputs whose unit is unicode, it is possible to effectively generate speech recognition results for all languages. Furthermore, when the speech language classification of the input speech data is not confident, the apparatus is configured to output a speech recognition result using a general-purpose output layer capable of outputting all languages with respect to the input speech data. Accordingly, although the general-purpose output layer has slightly lower performance than that of the dedicated output layer, it can prevent malfunctions that generate incorrect language output when speech language recognition is not performed properly.

In addition, the speech recognition apparatus of the present embodiment can be usefully applied to a case in which speech recognition of only a single language is possible due to a hardware limitation of a terminal device in a situation where multilingual speech recognition is required. For example, multilingual speech recognition can be performed with one artificial intelligence model that has been installed in a speech recognition device of low specification, and a user's utterance can be automatically recognized and processed, so that a speech recognition service can be effectively implemented.

In more detail, a speech recognition model that can be employed in the above-described speech recognitor will be described in more detail as follows.

Figure 2:
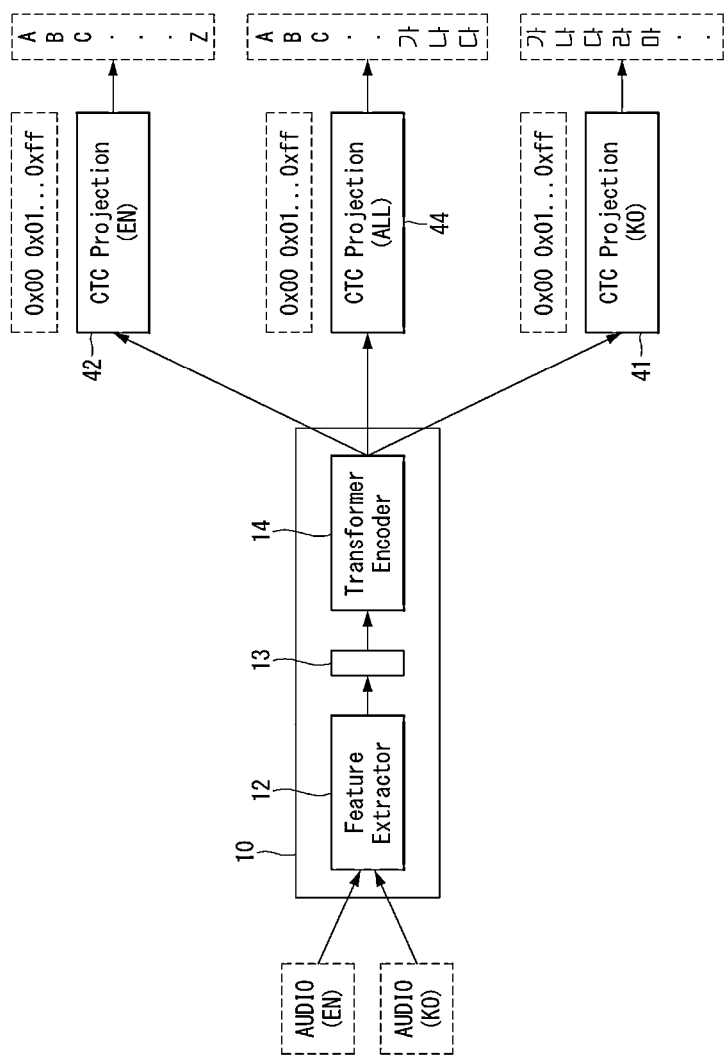
FIG. 2 is a block diagram illustrating a speech recognition model that can be employed in the speech recognitor of the apparatus for automatic multilingual speech recognition of FIG. 1.

FIG. 2 is a block diagram illustrating a speech recognition model that can be employed in the speech recognitor of the apparatus for automatic multilingual speech recognition of FIG. 1.

Referring to FIG. 2, the speech recognition model of this embodiment may have a model type that recognizes Korean and English.

The speech recognition model of the speech recognitor 10 of this embodiment may be configured to extract the speech feature information by passing the audio input in English (EN) and Korean (KO) through the feature extractor 12 having 7-layer CNN structure and the transformer encoder 14 having a 24-layer CNN structure. In addition, the speech recognition model may further include a feature projection 13 between the feature extractor 12 and the transformer encoder 14. The feature projection 13 converts the output of the feature extractor 12 into an input suitable for the transformer encoder 14. The feature projection 13 may have a project layer or a linear layer.

For example, the feature extractor 12 may include one 1D convolution of the first layer, four 1D convolutions of the second to fifth layers, and two 1D convolutions of the sixth to seventh layers. An activation function unit such as a Gaussian error linear unit (GELU) may be coupled to an output terminal of each 1D dimensional convolution. One 1D convolution of the first layer has one input channel and 512 output channels, and may operate under conditions of a kernel size of 10 and a stride of 5. Each 1D convolution of the second to fifth layers has 512 input channels and 512 output channels, and may operate under conditions of a kernel size of 3 and a stride of 2. In addition, each 1D convolution of the sixth to seventh layers has 512 input channels and 512 output channels, and may operate under conditions of a kernel size of 2 and a stride of 2.

The feature projection 13 may have a linear layer with 512 input dimensions and 1024 output dimensions.

In addition, the transformer encoder 14 may include 24 transformer encoders each including an attention layer and a feed forward layer. The attention layer may include linear layers and an output presentation layer, and the feed forward layer may include linear layers and a GELU disposed therebetween. An in_dense layer on the input side of the feed forward layer may include a linear layer having 1024 input dimensions and 4096 output dimensions, and an out_dense layer on the output side of the feed forward layer may have a linear layer having 4096 input dimensions and 1024 output dimensions.

Then, the speech recognition model may output a final speech recognition result through a CTC projection output layer 41 capable of outputting Korean (KO), a CTC projection output layer 42 capable of outputting English (EN), or a CTC projection output layer 44 capable of outputting both KR and EN.

In this case, the output unit of each CTC projection output layer 21, 42, 44 is the unit of unicode corresponding to 1 byte (8 bits), and a final result may be generated by recombining a plurality of output units of the speech recognition model. In the output unit, the plurality of output units is preferably 256, but may not be limited thereto. Here, the byte unit information may be expressed in an octal representation method, for example, as values within 0x00 to 0xff.

The unicode representation in byte unit can express all languages in the world with 256 (28) 8-bit (1 byte) combinations. Even if the number of languages supported by the speech recognition model increases, the size of the overall model increases only by the CTC projection output layer that supports 256-step output.

In particular, in the case of Korean, a fairly large number of output layers is required to generate a speech recognition model for a predetermined number of characters that Hangul can have, for example, 2904, 11,172, and the like. However, if expressed through the combination of unicode of the present embodiment, each language can be expressed with 256 bytes.

That is, each of the aforementioned CTC projections 41, 42, 44 may include a linear layer, and each linear layer of the CTC projection may be configured to have 1024 input dimensions and 256 output dimensions. Actually, the output dimension of the CTC projection can have a value slightly larger than 1 byte (28 bits), such as 256+@. Here, @ may correspond to the number of special tokens added to assist the CTC operation. Special tokens may include space characters for spaces, and tokens that mark the beginning and end of a sentence.

Table 1 is an example of expressing multiple languages in binary unicode (byte).

TABLE 1

| Characters | Bytes |
| --- | --- |
| A | 010000001 |
| 가 | 11101010 10110000 10000000 |
| 안녕 | 11101100 10010101 10001000 11101011 10000101 10010101 |
| あ | 11100011 10000001 10000010 |

As described above, a combination of unicode in each of most languages in the world other than Korean, English, and Japanese can be represented with 256 bytes. That is, the unicode of the present embodiment may be defined differently from the existing unicode processed by encoding methods such as ISO/IEC 10646, UCS, UTF, and the like, and character processing algorithms.

According to this embodiment, all languages recognized by the speech recognition apparatus share the speech recognition model structure in common, and a separate CTC projection output layer for each language is configured. Then, when speech language classification is not confident, it is configured to use a general-purpose output layer capable of simultaneously learning and outputting all languages, so that it is possible to prevent malfunction of speech recognition and greatly increase the reliability of the speech recognition apparatus.

Meanwhile, in the present embodiment, the apparatus for automatic multilingual speech recognition that automatically recognizes audio data in Korean and English based on a single model of artificial intelligence has been illustrated, but it is apparent that present disclosure can be applied to an apparatus for automatic multilingual speech recognition based on a single artificial intelligence model that automatically recognizes one or more additional languages other than Korean and/or English.

Hereinafter, a speech language classification model that can be employed in the speech language classifier described above with reference to FIG. 1 will be described in more detail as follows.

Figure 3:
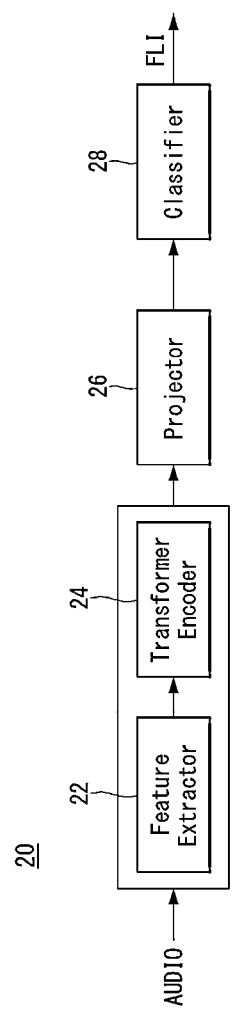
FIG. 3 is a block diagram for describing a speech language classification model that can be employed in the speech language classifier of the apparatus for automatic multilingual speech recognition of FIG. 1.
Figure 4:
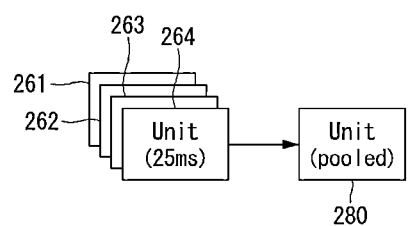
FIG. 4 is a block diagram for describing an operation principle of the projector layer of the speech language classification model of FIG. 3.

FIG. 3 is a block diagram for describing a speech language classification model that can be employed in the speech language classifier of the apparatus for automatic multilingual speech recognition of FIG. 1, and FIG. 4 is a block diagram for describing an operation principle of the projector layer of the speech language classification model of FIG. 3.

Referring to FIG. 3, the speech language classification model of the speech language classifier 20 of the present embodiment may be mounted to improve the speech recognition performance of the speech recognition model.

The speech language classification model may include a speech information extractor, a projector layer 26 and a classifier 28. The speech information extractor may be configured based on the Wav2Vec model, and may include a feature extractor 22 and a transformer encoder 24.

The above-described speech language classification model divides speech information into a unit of 25 milliseconds (ms), extracts speech information using the feature extractor 22 and the transformer encoder 24, and operates a mean value of the extracted speech information in units of 25 milliseconds through the projector layer 26, so that the language on speech information can be classified by the classifier 28.

In the present embodiment, speech information is divided and used in units of 25 milliseconds, but the scope of the present embodiment is not limited thereto. Within the range where there is no significant problem in the performance of the automatic speech recognition apparatus, the feature extraction unit of speech information may be selected from 5 milliseconds to 45 milliseconds in consideration of the trade-off relationship between hardware performance, processing speed, and reliability.

On the other hand, the projector layer 26, as shown in FIG. 4, may generate one speech information (pooled unit) 280 through the mean pooling operation of the speech information 261, 262, 263, 264 in units of 25 milliseconds.

Figure 5:
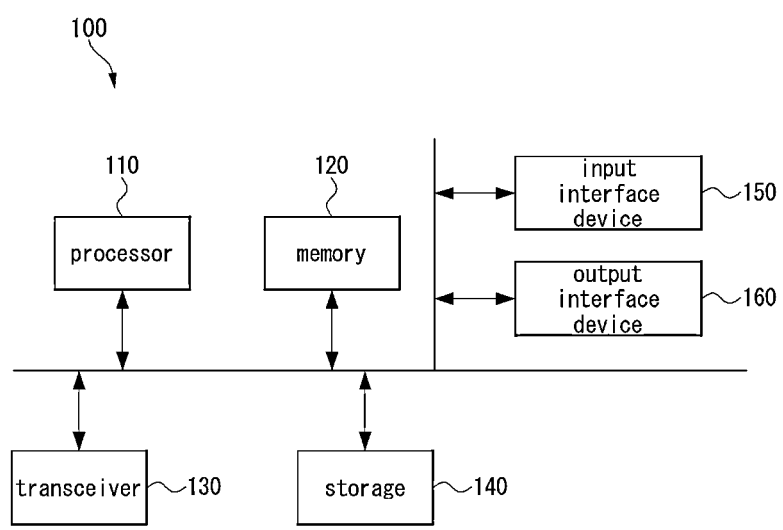
FIG. 5 is a schematic block diagram of an apparatus for automatic multilingual speech recognition according to another embodiment of the present disclosure.

FIG. 5 is a schematic block diagram of an apparatus for automatic multilingual speech recognition according to another embodiment of the present disclosure.

Referring to FIG. 5, the speech recognition apparatus 100 may include a processor 110 and a memory 120 for storing at least one instruction executed by the processor 110. Also, the speech recognition apparatus 100 may include a transceiver 130, a storage 140, an input interface device 150, an output interface device 160, and a bus.

At least one instruction performs multilingual speech recognition with one artificial intelligence model, even when the processor 110 has a specification that allows only a single language speech recognition due to the hardware limitations of a terminal device in a situation where multilingual speech recognition is required, and may be configured to automatically recognize the user's utterance to perform a service providing a speech recognition result.

The processor 110 may refer to a central processing unit (CPU), a graphics processing unit (GPU), or a dedicated processor on which methods according to embodiments of the present disclosure are performed.

Each of the memory 120 and the storage device 140 may be configured as at least one of a volatile storage medium and a non-volatile storage medium. For example, each of the memory 120 and the storage device 140 may include at least one of a read only memory (ROM) and a random access memory (RAM).

The transceiver 130 may include at least one sub-communication system for performing communication through a wired, wireless, or satellite network.

The speech recognition apparatus 100 of this embodiment described above may be integrally coupled to or mounted on, for example, a desktop computer, a laptop computer, a notebook, a smart phone, a tablet PC, a mobile phone, a smart watch, a smart glass, an e-book reader, a portable multimedia player (PMP), a portable game console, a navigation device, a digital camera, a digital multimedia broadcasting (DMB) player, a digital audio recorder, a digital audio player, a digital video recorder, a digital video player, a personal digital assistant (PDA), and the like.

Figure 6:
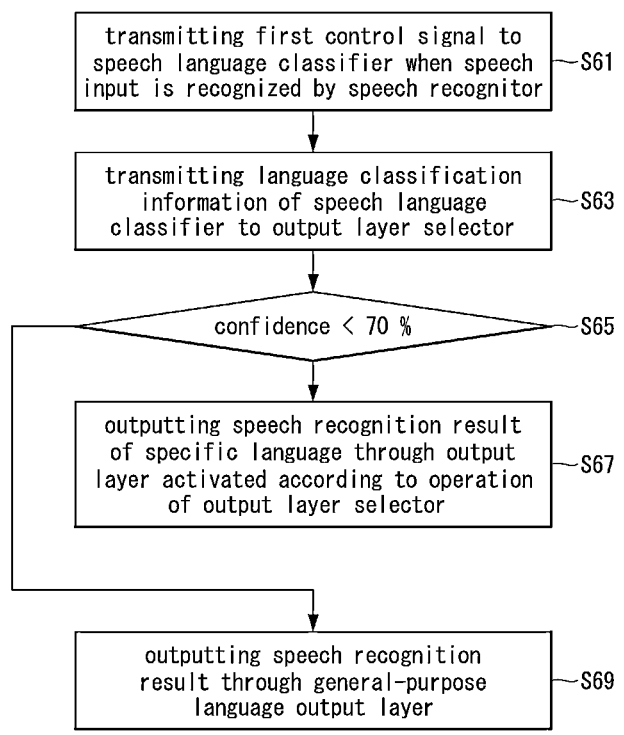
FIG. 6 is a flowchart for describing a specific operating principle that may be employed in the speech recognition apparatus of FIG. 5.

FIG. 6 is a flowchart for describing a specific operating principle that may be employed in the speech recognition apparatus of FIG. 5.

Referring to FIG. 6, the speech recognition apparatus may transmit a first control signal to the speech language classifier when a speech input is recognized by the speech recognizer (S61).

Next, the language classification information of the speech language classifier may be transmitted to the output layer selector (S63).

Next, it may be determined whether the confidence of the speech language classification of the speech language classifier is less than a first reference value, for example, 70%. The first reference value is exemplified as 70%, but is not limited thereto, and may be arbitrarily determined in the range of 60% to 90% depending on a place of use, purpose of use, required performance, and the like.

If the confidence is greater than or equal to the first reference value, the speech recognition apparatus may output the speech recognition result of a corresponding language through the output layer activated according to the operation of the output layer selector based on the speech classification information of the speech language classifier (S67).

On the other hand, if the confidence is less than the first reference value, the speech recognition apparatus ignores the speech classification information of the speech language classifier, and may output the speech recognition result for the speech input through a general-purpose language output layer capable of outputting all languages supported by the speech recognition device, that is, a general-purpose output layer (S69).

According to the above-described speech recognition apparatus, since multiple languages can be simultaneously recognized in one artificial intelligence model, unlike the existing single language speech recognitor, multilingual speech recognition can be easily implemented in various devices with only one model of memory. That is, there is an effect that multilingual speech recognition can be implemented with only one deep learning model in kiosks of low specification, personal computers, various electronic devices or terminals. In addition, the shared speech recognition model can improve the multilingual speech recognition performance in low resources.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method for automatic multilingual speech recognition based on artificial intelligence of a single model and performed by a speech recognition apparatus comprising at least one processor and a memory storing instructions executed by the processor, the method comprising:
    recognizing, by a speech recognizer including a convolutional neural network (CNN)-based feature extractor and a transformer encoder, input audio data and converting the input audio data into feature representations;
    classifying, by a speech language classifier connected to the speech recognizer, a language corresponding to the input audio data based on the feature representations, and generating language classification information including a confidence level;
    selecting and activating, by an output layer selector operatively coupled to the speech recognizer, one projection output layer from among a plurality of projection output layers based on the language classification information, wherein each projection output layer is configured to correspond to a specific language and includes a set of language-specific character units represented in a byte format; and
    generating, by the activated projection output layer, output values in units of bytes corresponding to the classified language to produce a speech recognition result for the input audio data,
    wherein the plurality of projection output layers includes a general-purpose projection output layer configured to be activated when the confidence level is below a predetermined threshold.

2. The method of claim 1, wherein the plurality of projection output layers comprise a first projection output layer dedicated to a first language, a second projection output layer dedicated to a second language, and a third projection output layer configured as a general-purpose output layer.

3. The method of claim 2, wherein the step of selecting and activating the projection output layer comprises:
    determining whether the confidence level included in the language classification information is less than a first reference value; and
    activating the third projection output layer when the confidence level is less than the first reference value.

4. The method of claim 2, wherein each character unit is represented as a unicode value encoded in a one-byte (8-bit) octal format supporting 256 combinations.

5. The method of claim 2, wherein the first language includes Korean, and the first projection output layer is configured to represent Hangul character combinations using a predefined set of Unicode values within 256 bytes.

6. The method of claim 1, wherein the step of classifying the input audio data comprises:
    dividing the input audio data into segments of a predetermined size by a speech information extractor;
    performing mean pooling on extracted speech information in each segment using a projector layer connected to the speech information extractor; and
    determining, by a classifier connected to the projector layer, a target language from among a set of predefined languages based on the mean pooled speech information.

7. The method of claim 6, wherein the speech information extractor comprises a convolutional neural network (CNN) including a plurality of layers configured to receive the input audio data as input and extract features from the input audio data.

8. The method of claim 7, wherein the CNN-based feature extractor is connected to the transformer encoder composed of a plurality of layers, and wherein the transformer encoder extracts speech feature information or the language classification information based on the features output by the CNN-based feature extractor.

9. The method of claim 6, wherein the projector layer performs the mean pooling on the speech information extracted from the predetermined-sized segments.

10. The method according to claim 6, wherein the predetermined size of each segment is 25 milliseconds.

11. An apparatus for automatic multilingual speech recognition that automatically recognizes audio data in multiple languages based on artificial intelligence of a single model, the apparatus comprising:

a processor; and
a memory that stores at least one instruction executed by the processor,
the processor comprising:
a speech recognizer configured to receive and convert input audio data into intermediate feature representations using a convolutional feature extractor and a transformer encoder;
a speech language classifier configured to process the intermediate feature representations to generate language classification information corresponding to the input audio data; and
an output layer selector, operatively coupled to the speech recognizer, configured to select and activate one projection output layer from among a plurality of projection output layers based on the language classification information, wherein each projection output layer is configured to correspond to a specific language and includes a set of language-specific character units represented in a byte format;
wherein the activated projection output layer generates output values in units of bytes corresponding to the language classification information to produce a speech recognition result for the input audio data, and
wherein the plurality of projection output layers includes a general-purpose projection output layer configured to be activated when a confidence level is below a predetermined threshold.

12. The apparatus of claim 11, wherein the plurality of projection output layers comprise a first projection output layer dedicated to a first language, a second projection output layer dedicated to a second language, and a third projection output layer configured as a general-purpose output layer.

13. The apparatus of claim 12, wherein in the step of when the processor selects and activates the projection output layer, the at least one instruction causes the processor to determine whether the confidence level included in the language classification information is less than a first reference value, and activate the third projection output layer when the confidence level is less than the first reference value.

14. The apparatus of claim 12, wherein each character unit is represented as a unicode value encoded in a one-byte (8-bit) octal format supporting 256 combinations.

15. The apparatus of claim 12, wherein the first language includes Korean, and the first projection output layer is configured to represent Hangul character combinations using a predefined set of Unicode values within 256 bytes.

16. The apparatus of claim 11, wherein when the processor classifies the audio data, the at least one instruction causes the processor to:

divide the input audio data into segments of a predetermined size by a speech information extractor;
perform mean pooling on extracted speech information in each segment using a projector layer connected to the speech information extractor; and
determining, by a classifier connected to the projector layer, a target language from among a set of predefined languages based on the mean pooled speech information.

17. The apparatus of claim 16, wherein the speech information extractor comprises a convolutional neural network (CNN) including a plurality of layers configured to receive the audio data as input and extract features from the input audio data.

18. The apparatus of claim 17, wherein the convolutional feature extractor is connected to the transformer encoder composed of a plurality of layers, and wherein the transformer encoder extracts speech feature information or the language classification information based on the features output by the convolutional feature extractor.

19. The apparatus of claim 16, wherein the projector layer performs the mean pooling on the speech information extracted from the predetermined-sized segments.

20. The apparatus of claim 16, wherein the predetermined size of each segment is 25 milliseconds.

* * * * *